(12) United States Patent
Che et al.

(10) Patent No.: US 12,327,928 B1
(45) Date of Patent: Jun. 10, 2025

(54) MULTI-FREQUENCY BASE STATION ANTENNA UNIT AND COMMUNICATION DEVICE

(71) Applicant: South China University of Technology, Guangzhou (CN)

(72) Inventors: Wenquan Che, Guangzhou (CN); Yongzheng Li, Guangzhou (CN); Wanchen Yang, Guangzhou (CN); Quan Xue, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 18/875,413

(22) PCT Filed: Oct. 9, 2022

(86) PCT No.: PCT/CN2022/124196
§ 371 (c)(1),
(2) Date: Dec. 16, 2024

(87) PCT Pub. No.: WO2023/240848
PCT Pub. Date: Dec. 21, 2023

(30) Foreign Application Priority Data

Jun. 16, 2022 (CN) .......................... 202210678337.2

(51) Int. Cl.
*H01Q 5/307* (2015.01)
*H01Q 1/24* (2006.01)
*H01Q 13/20* (2006.01)

(52) U.S. Cl.
CPC .............. *H01Q 5/307* (2015.01); *H01Q 1/24* (2013.01); *H01Q 1/246* (2013.01); *H01Q 13/20* (2013.01); *H01Q 13/206* (2013.01)

(58) Field of Classification Search
CPC .......... H01Q 5/307; H01Q 1/246; H01Q 1/24; H01Q 13/206; H01Q 13/20
See application file for complete search history.

(56) References Cited

U.S. PATENT DOCUMENTS

| 7,358,922 B2 * | 4/2008 | Le .......................... H01Q 1/246 343/810 |
| 2021/0098864 A1 * | 4/2021 | Zhang .................... H01Q 1/523 |

(Continued)

FOREIGN PATENT DOCUMENTS

| CN | 108539383 A | 9/2018 |
| CN | 108832310 A | 11/2018 |

(Continued)

OTHER PUBLICATIONS

Sheng Jie Yang, Compact Dual-Band Base-Station Antenna Using Filtering Elements, IEEE Transactions on Antennas and Propagation, vol. 70, No. 8, Aug. 2022.

(Continued)

*Primary Examiner* — Hai V Tran
(74) *Attorney, Agent, or Firm* — The Dobrusin Law Firm, PC (57) ABSTRACT

Disclosed in the present invention are a multi-frequency base station antenna unit and a communication device, which belong to the technical field of antennas. The multi-frequency base station antenna unit comprises a first radiator and a second radiator, wherein the first radiator comprises a first radiation structure, which has at least one operating frequency band, and a coupling resonance structure, a first extra operating frequency band can be generated by loading the coupling resonance structure on the first radiation structure, and the second radiator is located above the first radiator and is configured to generate a second extra operating frequency band. The present invention solves the problems in respect of multi-frequency compatibility in (Continued)

current base station antennas wherein there are few frequency bands and strong coupling between the frequency bands.

16 Claims, 7 Drawing Sheets

(56) References Cited

U.S. PATENT DOCUMENTS

| | | | |
|---|---|---|---|
| 2021/0305722 A1 | 9/2021 | Zhang | |
| 2023/0006368 A1* | 1/2023 | Yang | H01Q 25/00 |
| 2023/0071050 A1* | 3/2023 | Sun | H01Q 21/24 |
| 2023/0137645 A1* | 5/2023 | Shen | H01Q 21/24 |
| 2023/0231319 A1* | 7/2023 | Gonzalez | H01Q 5/10 |
| | | | 343/702 |

FOREIGN PATENT DOCUMENTS

| | | |
|---|---|---|
| CN | 109904593 A | 6/2019 |
| CN | 113285219 A | 8/2021 |
| CN | 113471666 A | 10/2021 |
| CN | 113517572 A | 10/2021 |
| CN | 113922049 A | 1/2022 |
| CN | 115051142 A | 9/2022 |
| WO | 2021/073089 A1 | 4/2021 |
| WO | 2021/232820 A1 | 11/2021 |
| WO | 2022/002257 A1 | 1/2022 |

OTHER PUBLICATIONS

Luo, A Wideband Dual-Polarization Base Station Antenna for LET and Sub-6 GHz Bands Applications, Chinese Journal of Electron Device, vol. 43, No. 2, Apr. 2020.
Wang, Design of Mixed-Feed Mode Printing Multi-Band Monopole Antenna, Applied Scient and Technology, vol. 40, No. 2, Apr. 2013.
Han, Multiband Microstrip Antenna Design Using Parasitic Coupling Elements, Journal of Beijing University of Posts and Telecommunications, vol. 41, No. 4, Aug. 2018.
Chinese Notification to Grant Patent Right for Invention dated Jun. 27, 2023, Application No. CN202210678337.2.
Chinese First Office Action dated Feb. 11, 20223, Application No. CN202210678337.2.

* cited by examiner

MULTI-FREQUENCY BASE STATION ANTENNA UNIT AND COMMUNICATION DEVICE

FIELD OF THE INVENTION

The present disclosure relates to the field of communications, and particularly to a multi-frequency base station antenna unit and a communication device.

BACKGROUND OF THE INVENTION

Currently, the contradiction between the demand for multi-frequency compatibility of mobile communication base stations and the limited installation space of antenna arrays puts forward an urgent demand for multi-frequency aperture-shared capability of base station antenna arrays. In traditional schemes, multiple antennas operating in different single frequency bands are used to achieve multi-frequency integration through nesting or stacking. However, this method has problems such as shielding effect, poor isolation between frequency bands, and a limited number of integrated frequency bands.

SUMMARY OF THE INVENTION

In order to overcome the above-mentioned drawbacks and disadvantages of the related art, it is an object of the present disclosure to provide a multi-frequency base station antenna unit and a communication device.

The present disclosure provides a miniaturized multi-frequency base station antenna based on the coupled resonator principle. According to the antenna, three frequency bands are realized using a single antenna based on the coupled resonator principle, thereby fundamentally solving the problems of shielding effect, poor isolation, and a limited number of integrated frequency bands in the traditional multi-frequency base station antenna, and therefore can further increase the number of operating frequency bands of the existing multi-frequency base station antenna and reduce the size thereof.

The present disclosure adopts the following technical solutions.

A multi-frequency base station antenna unit is provided, including a first radiator and a second radiator;

the first radiator includes first radiation structure, which has at least one operating frequency band, and a coupling resonance structure; a first extra operating frequency band is able to be generated by loading the coupling resonance structure on the first radiation structure;

the second radiator is located above the first radiator and configured to generate a second extra operating frequency band;

a resonant frequency $f_L$ of the coupling resonance structure is within a range of $0.68f_0$-$0.87f_0$, and a center frequency $f_H$ of the second extra operating frequency band generated by the second radiator is greater than $f_0$, where $f_0$ is a center frequency of a lowest operating frequency band of the first radiation structure, and the resonant frequency of the coupling resonance structure refers to a frequency at which a lowest-order eigenmode of the coupling resonance structure is located;

the first radiator and the second radiator have respective independent feed structures.

Further, the second radiator includes a first dielectric substrate, a first dielectric block, and a high-frequency feed structure from top to bottom, where a surface of the first dielectric substrate is provided with a second radiation structure, and the bottom surface of the first dielectric block is covered with a metal foil.

Further, the high-frequency feed structure includes a microstrip balun, a coaxial-microstrip adapter plate, and coaxial lines, where the microstrip balun is formed by crossing two dielectric substrates with microstrip lines etched on surfaces.

Further, the first radiator includes a second dielectric block, a third dielectric block, a second dielectric substrate, a fourth dielectric block, and a low-frequency feed structure successively from top to bottom;

the first radiation structure is provided on top and bottom surfaces of the second dielectric substrate, where the first radiation structure is in the form of a dipole; the top and bottom surfaces of the second dielectric substrate are provided with dipoles with radiation field polarizations orthogonal to each other, with an opening angle of 90 degrees between each pair of dipole arms;

the fourth dielectric block is loaded with the coupling resonance structure; the coupling resonance structure is in the form of upward-opening rectangular split-ring shaped metal foils; a vertical distance gap between an upper edge of the coupling resonance structure and a bottom surface of the second dielectric substrate is less than $0.01\lambda_0$, where $\lambda_0$ is a wavelength at a center frequency of an operating frequency band of the first radiation structure; the coupling resonance structure is loaded to generate the first extra operating frequency band.

Further, the second dielectric block has a thickness of not greater than $0.08\lambda_L$, where $\lambda_L$ is a wavelength at a center frequency of a lowest operating frequency band of the first radiator.

Further, a top surface and side surfaces of the second dielectric block are loaded with parasitic structures including a patch-shaped parasitic structure and an annular parasitic structure.

Further, the patch-shaped parasitic structure includes one or more rectangular or circular metal foils, with a side length or radius less than $0.2\lambda_0$, where $\lambda_0$ is a corresponding wavelength at the center frequency of the operating frequency band of the first radiation structure;

the annular parasitic structure is an annular metal foil, with an outer circumference not less than $\lambda_L$, where $\lambda_L$ is a resonant frequency of the coupling resonance structure.

Further, the second dielectric substrate has a thickness of not exceeding 0.6 mm, and a top surface of the second dielectric substrate is provided with the first radiation structure configured to realize two operating frequency bands;

the first radiation structure includes four square metal foils, and there is no direct current path among the four square metal foils; each square metal foil has a side length of not exceeding $0.18\lambda_0$; a surface of the square metal foil is etched with a rectangular split-ring shaped pattern, and the rectangular split-ring shaped pattern has an inner edge circumference of not exceeding $0.5\lambda_1$; the four square metal foils are arranged in a centrally symmetric manner, and the split-ring shaped pattern is open towards a symmetry center; a symmetry center axis passes through a geometric center of the second dielectric substrate; the first radiation structure is able to generate two operating frequency bands with center frequencies of $f_0$ and $f_1$, respectively, where $\lambda_0$ is a wavelength corresponding to $f_0$, and $\lambda_1$ is a wavelength corresponding to $f_1$; the first radiator including the first radiation structure is able to generate three operating frequency bands at this time.

Further, permittivities of the first dielectric block, the second dielectric block, and the fourth dielectric block are not less than 5.

A communication device is provided, including the multi-frequency base station antenna unit.

Compared with the related art, the present disclosure has the following advantages and beneficial effects.

1) The miniaturized multi-frequency base station antenna based on the coupled resonator principle proposed by the present disclosure can provide more integrated frequency bands than the conventional multi-frequency base station antenna (specifically taking three operating frequency bands as an example).
2) According to the miniaturized multi-frequency base station antenna based on the coupled resonator principle proposed by the present disclosure, the first two frequency bands are fed using the same port, avoiding the problems of different-frequency isolation and pattern distortion of the conventional multi-frequency base station antenna.
3) According to the miniaturized multi-frequency base station antenna based on dielectric loading proposed by the present disclosure, the resonant length of the radiator is shortened by loading the dielectric block with a high permittivity, thereby effectively reducing the size of the antenna.

DETAILED DESCRIPTION OF THE EMBODIMENTS

Hereinafter, the present disclosure will be described in further detail with reference to embodiments, but the implementations of the present disclosure are not limited thereto.

Embodiment 1

Figure 1:
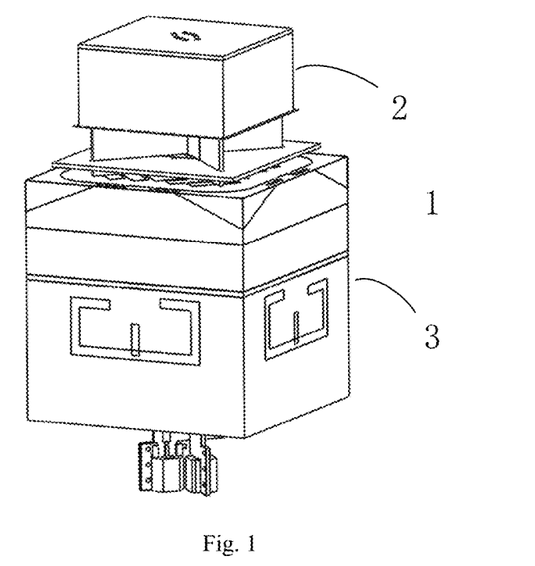
FIG. 1 is a three-dimensional structural diagram of a three-frequency antenna unit according to an embodiment of the present disclosure.
Figure 2:
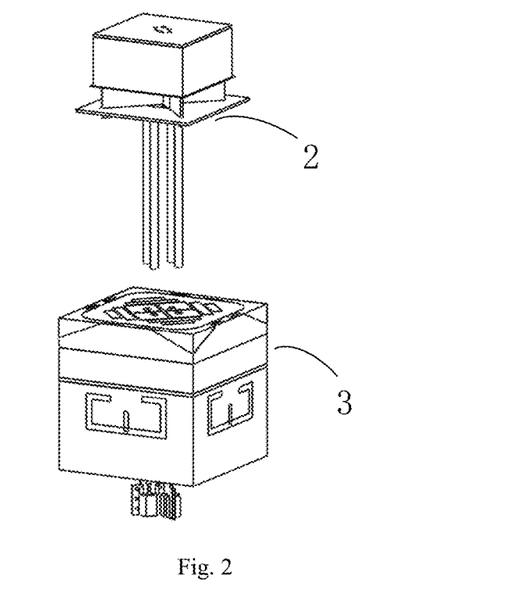
FIG. 2 is a schematic diagram of relative positions of a first radiator and a second radiator according to an embodiment of the present disclosure.

As shown in FIGS. 1-2, a multi-frequency base station antenna unit is provided, including a second radiator 2 and a first radiator 3. The first radiator 3 is located below the second radiator 2.

Figure 12:
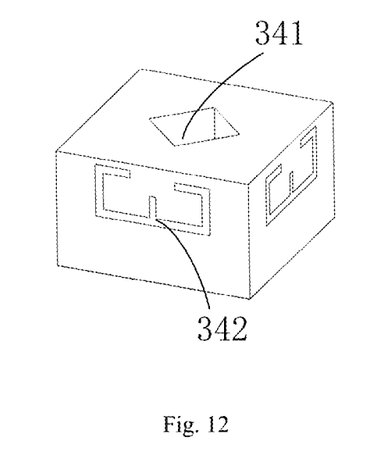
FIG. 12 is a schematic diagram of a third dielectric block and a coupling resonance structure provided on surfaces of the third dielectric block according to an embodiment of the present disclosure.
Figure 13:
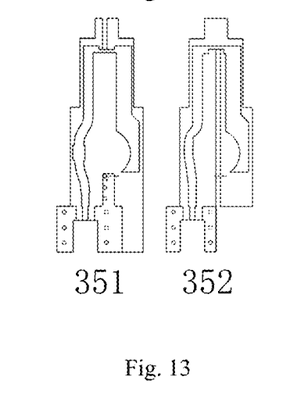
FIG. 13 is a schematic structural diagram of two dielectric substrates constituting a low-frequency feed structure according to an embodiment of the present disclosure.

Referring to FIGS. 2 and 12, the first radiator 3 includes first radiation structure, which has at least one operating frequency band, and a coupling resonance structure 342. The coupling resonance structure is loaded on the first radiation structure and coupled to the first radiation structure, and the coupling intensity between resonant modes generated by the first radiation structure is changed, thus generating a first extra operating frequency band.

The second radiator 2 is located above the first radiator 3 and configured to generate a second extra operating frequency band.

A resonant frequency $f_L$ of the coupling resonance structure is within a range of $0.68f_0$-$0.87f_0$, and a center frequency $f_H$ of the second extra operating frequency band generated by the second radiator is greater than $f_0$, where $f_0$ is a center frequency of a lowest operating frequency band of the first radiation structure, and the resonant frequency of the coupling resonance structure refers to a frequency at which a lowest-order eigenmode of the coupling resonance structure is located.

The first radiator and the second radiator have respective independent feed structures.

Figure 3:
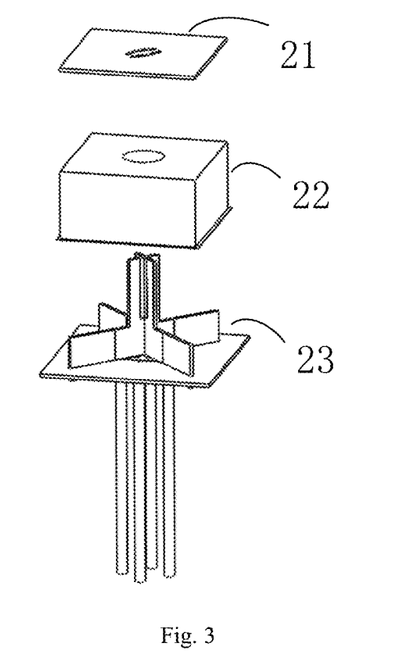
FIG. 3 is an exploded structural diagram of a second radiator according to an embodiment of the present disclosure.
Figure 4:
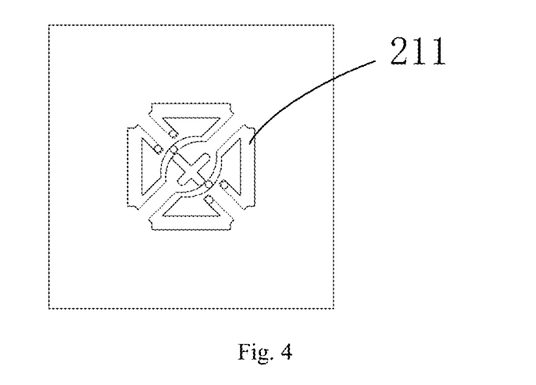
FIG. 4 is a schematic diagram of a first dielectric substrate and a second radiation structure provided on a surface of the first dielectric substrate according to an embodiment of the present disclosure.
Figure 5:
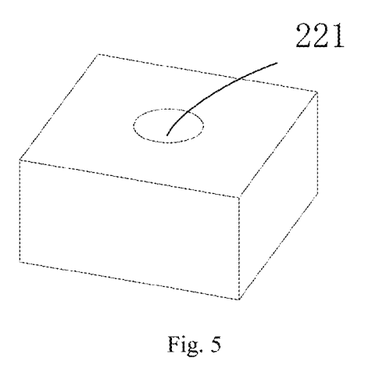
FIG. 5 is a schematic structural diagram of a first dielectric block according to an embodiment of the present disclosure.

Referring to FIGS. 3-5, the second radiator 2 mainly includes a first dielectric substrate 21, a first dielectric block 22, and a high-frequency feed structure 23. A top surface of the first dielectric substrate 21 is provided with a second radiation structure 211, and the first dielectric substrate 21 is closely attached to a top surface of the first dielectric block 22 so that a miniaturized second radiator may be realized.

Further, a bottom surface of the first dielectric block 22 is loaded with a metal foil to reflect an electromagnetic wave, and an avoidance hole 221 is arranged in the middle of the first dielectric block 22.

The second radiation structure 211 is a folded dipole, including four dipole arms and two groups of coplanar strip lines corresponding to ±45° polarization. The angle between adjacent dipole arms is 90°, and the four dipole arms form a square. The coplanar strip lines for the two polarizations are arranged along two diagonal lines of the first dielectric substrate 21.

Figure 6:
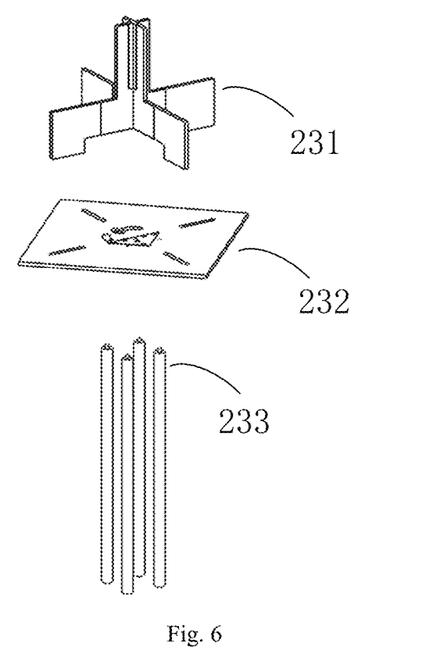
FIG. 6 is an exploded diagram of a high-frequency feed structure according to an embodiment of the present disclosure.
Figure 7:
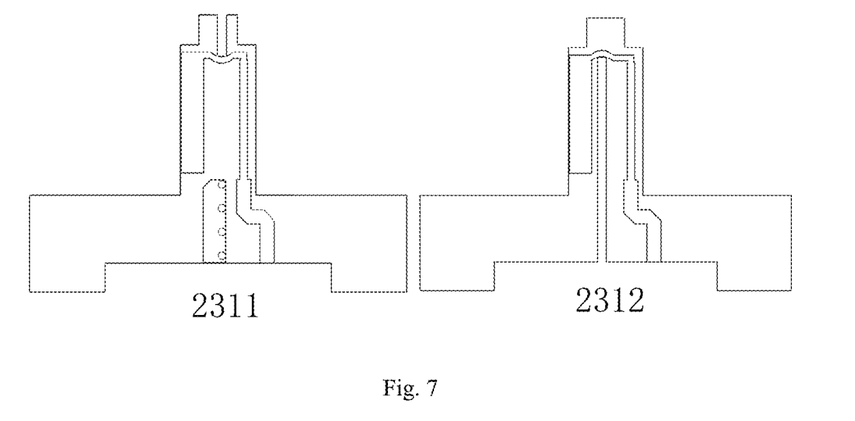
FIG. 7 is a schematic structural diagram of two substrates constituting a microstrip balun according to an embodiment of the present disclosure.

Referring to FIGS. 6-7, the high-frequency feed structure 23 mainly includes a microstrip balun 231, a coaxial-microstrip adapter plate 232, and coaxial lines 233. The microstrip balun 231 is formed by cross combination of dielectric substrates 2311 and 2312 with microstrip lines loaded on surfaces.

The second radiation structure generates a second extra frequency band, and the coaxial lines are transferred to the microstrip balun via the coaxial-microstrip adapter plate and excite the second radiation structure provided on the first dielectric substrate, and finally an impedance bandwidth covering 3300 MHz-3800 MHz is realized.

Referring to FIGS. 8-13, the first radiator 3 mainly includes a second dielectric block 31, a third dielectric block 32, a second dielectric substrate 33, a fourth dielectric block 34, and a low-frequency feed structure 35. The second dielectric block 31 and the third dielectric block 32 are located above the second dielectric substrate 33, and the fourth dielectric block 34 is located below the second dielectric substrate 33. The low-frequency feed structure 35 is formed by cross combination of a dielectric substrate 351 and a dielectric substrate 352. The second dielectric block 31 and the second dielectric substrate 33 are arranged with four axisymmetrically distributed avoidance holes 311 and avoidance holes 332, respectively.

Figure 8:
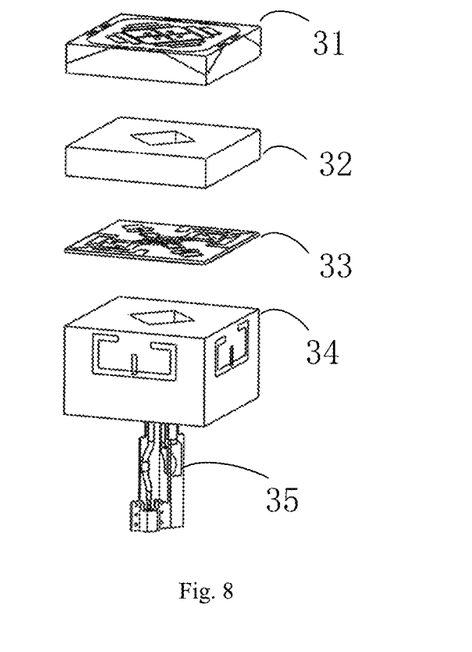
FIG. 8 is an exploded structural diagram of a first radiator according to an embodiment of the present disclosure.

Specifically, the avoidance hole is a circular hole, and four circular holes are symmetrical about a central point.

Figure 11:
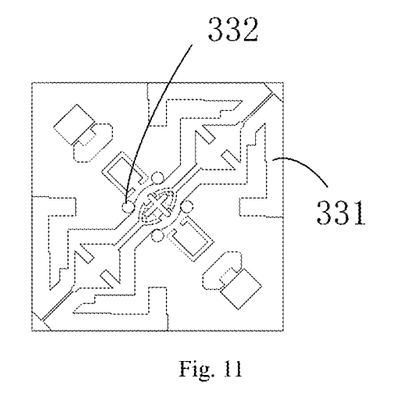
FIG. 11 is a schematic diagram of a second dielectric substrate and a first radiation structure provided on a surface of the second dielectric substrate according to an embodiment of the present disclosure.

Surfaces of the second dielectric substrates 33 are provided with the first radiation structure. The first radiation structure is in the form of a dipole. Top and bottom surfaces of the second dielectric substrate 33 are provided with dipoles with radiation field polarizations orthogonal to each other, with an opening angle of 90 degrees between each pair of dipole arms. The first radiation structure generates one operating frequency band.

Figure 10:
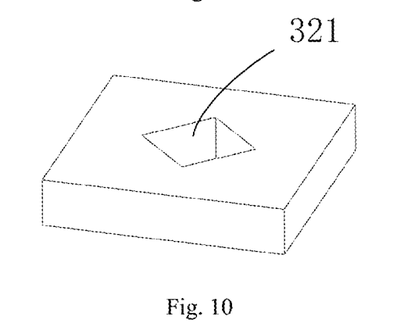
FIG. 10 is a schematic structural diagram of a fourth dielectric block according to an embodiment of the present disclosure.

The fourth dielectric block 34 is loaded with the coupling resonance structure 342. The coupling resonance structure is in the form of upward-opening rectangular split-ring shaped metal foils and located on four side surfaces of the fourth dielectric block. In addition, the coupling resonance structure is in the middle of each side surface near an upper edge. A bottom edge of the rectangular split-ring shaped metal foil extends upwardly one rectangular metal foil in the middle position.

A vertical distance gap between an upper edge of the coupling resonance structure and the bottom surface of the second dielectric substrate is less than $0.01\lambda_0$, where $\lambda_0$ is a wavelength at a center frequency of an operating frequency band of the first radiation structure. The coupling resonance structure is loaded to generate the first extra operating frequency band.

Figure 9:
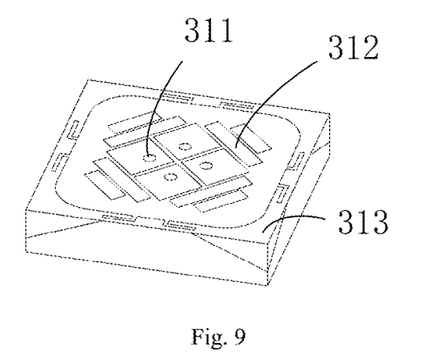
FIG. 9 is a schematic diagram of a second dielectric block and parasitic structures provided on a surface of the second dielectric block according to an embodiment of the present disclosure.

A square avoidance hole 321 and a square avoidance hole 341 are arranged in the center of the third dielectric block 32 and the fourth dielectric block 34, respectively. A top surface and side surfaces of the second dielectric block 31 are loaded with parasitic structures. The parasitic structures are located above the first radiation structure and include an annular parasitic structure and a patch-shaped parasitic structure.

Specifically, the top surface of the second dielectric block is loaded with the patch-shaped parasitic structure 312, and the side surfaces of the second dielectric block are loaded with the annular parasitic structure 313.

The patch-shaped parasitic structure has a side length or radius of less than $0.2\lambda_0$, where $\lambda_0$ is a corresponding wavelength at the center frequency of the operating frequency band of the first radiation structure. The patch-shaped parasitic structure includes four square patches. The four square patches are symmetrically arranged on a central position of the top surface of the second dielectric block and constitute a square. Two rectangular patches are provided on an outer side of each side of the square, and the two rectangular patches are not equal in length and are provided in parallel with the corresponding side.

The annular parasitic structure is an annular metal foil, with an outer circumference not less than $\lambda_L$, where $\lambda_L$ is a resonant frequency of the coupling resonance structure. The parasitic structures are provided on the top surface and four side surfaces of the second dielectric block. The annular parasitic structure is a square ring with rounded inner corners on the top surface of the second dielectric block, and on the side surfaces of the second dielectric block, it includes eight right triangles with right angles coinciding with the four upper corners of the second dielectric block. In this embodiment, the annular parasitic structure has an electrical connection between a top surface portion and side surface portions of the second dielectric block.

The purpose of introducing the parasitic structures is to introduce extra resonant modes to broaden the impedance bandwidth of a frequency band. In this embodiment, the parasitic structure can improve the impedance bandwidths of two frequency bands generated by the first radiator.

In installation, the coaxial lines 233 of the high-frequency feed structure 23 pass through the avoidance holes 311, 321, 332, and 341 from top to bottom. An upper end of the coaxial line 233 is connected to the coaxial-microstrip adapter plate 232, and a lower end of the coaxial line 233 is connected to a radio frequency connector (such as a SMA connector). The microstrip balun 231 passes through the avoidance hole 221 from bottom to top. An upper end of the microstrip balun 231 is connected to the second radiation structure 211, and a lower end of the microstrip balun 231 is connected to the coaxial-microstrip adapter plate 232. The low-frequency feed structure 35 passes through the avoidance hole 341 from bottom to top. An upper end of the low-frequency feed structure 35 is connected to the first radiation structure 331, and a lower end of the low-frequency feed structure 35 is connected to a radio frequency connector (such as a SMPM connector).

Figure 14:
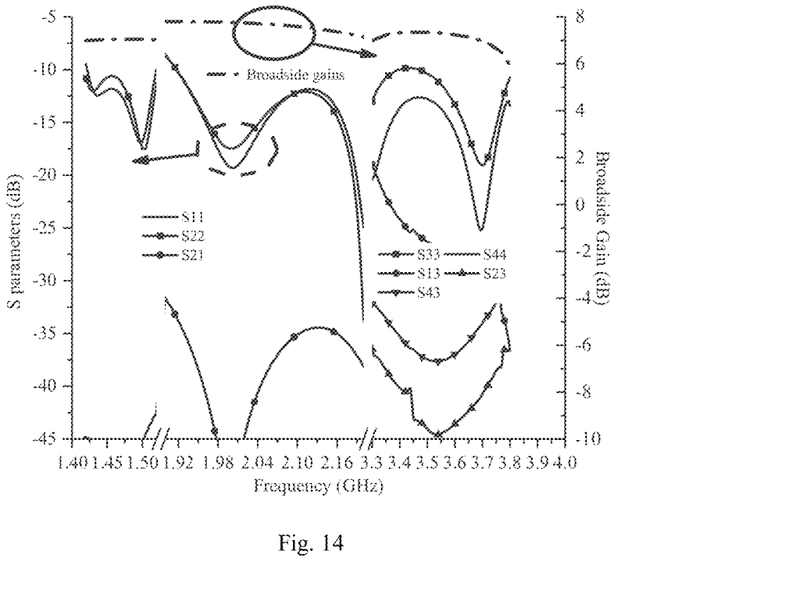
FIG. 14 is a simulation diagram of S parameters and broadside gain curves of frequency band units of a three-frequency antenna according to an embodiment of the present disclosure.

As shown in FIG. 14, the return losses of three frequency bands of this antenna unit are higher than 10 dB, the isolation between ports is higher than 20 dB, and the broadside gain curve changes smoothly.

According to the multi-frequency antenna unit proposed by the present disclosure, the multi-frequency antenna unit includes a coupling resonance structure, parasitic structures, a first radiation structure, a second radiation structure, and a plurality of dielectric blocks. The first radiation structure and the second radiation structure are installed on surfaces of dielectric substrates. The coupling resonance structure and the parasitic structures are provided on the surfaces of the dielectric block or the dielectric substrate. The coupling resonance structure is located below the first radiation structure, and the parasitic structure is located above the first radiation structure. The coupling resonance structure is loaded so that the first radiation structure can additionally generate an independently adjustable operating frequency band. The second radiation structure is located above the first radiation structure and additionally generates an independently adjustable operating frequency band. The operating frequency band is at a high frequency of the operating frequency band of the first radiation structure. One or more dielectric blocks are closely attached above or below the dielectric substrates provided with the first and second radiation structures. The dielectric block has a relative permittivity $\epsilon_r \geq 6.6$. The loading of the dielectric blocks can effectively reduce the overall size of the antenna without changing the operating frequency bands of the first and second radiation structures. The multi-frequency antenna unit can realize at least three operating frequency bands at a small size.

Embodiment 2

Embodiment 2 differs from embodiment 1 in that: the arrangement position and structure of the first radiation structure are different. The first radiator includes a second dielectric block, a third dielectric block, a second dielectric substrate, a fourth dielectric block, and a low-frequency feed structure successively from top to bottom.

The second dielectric substrate has a thickness of not exceeding 0.6 mm, and a top surface of the second dielectric substrate is provided with the first radiation structure configured to realize two operating frequency bands. The fourth dielectric block is loaded with the coupling resonance structure, and the coupling resonance structure is the same as that in embodiment 1.

The first radiation structure includes four square metal foils. The four square metal foils are provided on diagonal lines of the second dielectric substrate. One side of the square metal foil is an opening, and the opening direction is towards a central point of the second dielectric substrate.

There is no direct current path among the four square metal foils. Each square metal foil has a side length of not exceeding $0.18\lambda_0$. A surface of the square metal foil is etched with a rectangular split-ring shaped pattern, and the rectangular split-ring shaped pattern has an inner edge circumference of not exceeding $0.5\lambda_1$. The four square metal foils are arranged in a centrally symmetric manner, and the split-ring shaped pattern is open towards a symmetry center. A symmetry center axis passes through a geometric center of the second dielectric substrate. The first radiation structure can generate two operating frequency bands with center frequencies of $f_0$ and $f_1$, respectively, where $\lambda_0$ is a wavelength corresponding to $f_0$, and $\lambda_1$ is a wavelength corresponding to $f_1$.

The purpose of loading the coupling resonance structure is to increase the coupling between two low-frequency resonant modes of three resonant modes generated by the first radiation structure, thereby increasing the frequency spacing between the two resonant modes and generating two independently adjustable frequency bands. That is, the lowest-frequency resonant mode independently generates a first frequency band, and the other two resonant modes together generate a high-frequency second frequency band. The first radiation structure can generate two operating frequency bands with center frequencies of $f_0$ and $f_1$, respectively, where $\lambda_0$ is a wavelength corresponding to $f_0$, and $\lambda_1$ is a wavelength corresponding to $f_1$.

The above-mentioned embodiments are preferred embodiments of the present disclosure, but the implementations of the present disclosure are not limited by the embodiments. Any other changes, modifications, substitutions, combinations, and simplifications made without departing from the spirit and principle of the present disclosure shall be equivalent replacements and are included in the scope of the present disclosure.

The invention claimed is:

1. A multi-frequency base station antenna unit, comprising a first radiator and a second radiator,
    wherein the first radiator comprises first radiation structure, which has at least one operating frequency band, and a coupling resonance structure; a first extra operating frequency band is able to be generated by loading the coupling resonance structure on the first radiation structure;
    the second radiator is located above the first radiator and configured to generate a second extra operating frequency band;
    a resonant frequency $f_L$ of the coupling resonance structure is within a range of $0.68f_0$-$0.87f_0$, and a center frequency $f_H$ of the second extra operating frequency band generated by the second radiator is greater than $f_0$, wherein $f_0$ is a center frequency of a lowest operating frequency band of the first radiation structure, and the resonant frequency of the coupling resonance structure refers to a frequency at which a lowest-order eigenmode of the coupling resonance structure is located;
    the first radiator and the second radiator have respective independent feed structures;
    the first radiator comprises a second dielectric block, a third dielectric block, a second dielectric substrate, a fourth dielectric block, and a low-frequency feed structure successively from top to bottom;
    the fourth dielectric block is loaded with the coupling resonance structure; the coupling resonance structure is in the form of upward-opening rectangular split-ring shaped metal foils and located on four side surfaces of the fourth dielectric block; a vertical distance gap between an upper edge of the coupling resonance structure and a bottom surface of the second dielectric substrate is less than $0.01\lambda_0$, wherein $\lambda_0$ is a wavelength at a center frequency of an operating frequency band of the first radiation structure; the coupling resonance structure is loaded to generate the first extra operating frequency band.

2. The multi-frequency base station antenna unit according to claim 1, wherein
    the second radiator comprises a first dielectric substrate, a first dielectric block, and a high-frequency feed structure from top to bottom, wherein a surface of the first dielectric substrate is provided with a second radiation structure, and a bottom surface of the first dielectric block is covered with a metal foil.

3. The multi-frequency base station antenna unit according to claim 2, wherein the high-frequency feed structure comprises a microstrip balun, a coaxial-microstrip adapter plate, and coaxial lines, wherein the microstrip balun is formed by crossing two dielectric substrates with microstrip lines loaded on surfaces.

4. A communication device, comprising the multi-frequency base station antenna unit according to claim 3.

5. The multi-frequency base station antenna unit according to claim 2, wherein permittivities of the first dielectric block, the second dielectric block, and the fourth dielectric block are not less than 5.

6. A communication device, comprising the multi-frequency base station antenna unit according to claim 5.

7. A communication device, comprising the multi-frequency base station antenna unit according to claim 2.

8. The multi-frequency base station antenna unit according to claim 1, wherein the first radiation structure is provided on top and bottom surfaces of the second dielectric substrate, wherein the first radiation structure is in the form of a dipole; the top and bottom surfaces of the second dielectric substrate are provided with dipoles with radiation field polarizations orthogonal to each other, with an opening angle of 90 degrees between each pair of dipole arms.

9. The multi-frequency base station antenna unit according to claim 8, wherein a top surface and side surfaces of the second dielectric block are loaded with parasitic structures comprising a patch-shaped parasitic structure and an annular parasitic structure.

10. The multi-frequency base station antenna unit according to claim 9, wherein the patch-shaped parasitic structure comprises one or more rectangular or circular metal foils, with a side length or radius less than $0.2\lambda_0$, wherein $\lambda_0$ is a corresponding wavelength at the center frequency of the operating frequency band of the first radiation structure;

the annular parasitic structure is an annular metal foil, with an outer circumference not less than $\lambda_L$, wherein $\lambda_L$ is a resonant frequency of the coupling resonance structure.

11. A communication device, comprising the multi-frequency base station antenna unit according to claim 10.

12. A communication device, comprising the multi-frequency base station antenna unit according to claim 9.

13. A communication device, comprising the multi-frequency base station antenna unit according to claim 8.

14. The multi-frequency base station antenna unit according to claim 1, wherein the second dielectric substrate has a thickness of not exceeding 0.6 mm, and a top surface of the second dielectric substrate is provided with the first radiation structure configured to realize two operating frequency bands;

the first radiation structure comprises four square metal foils, and there is no direct current path among the four square metal foils; each square metal foil has a side length of not exceeding $0.18\lambda_0$; a surface of the square metal foil is etched with a rectangular split-ring shaped pattern, and the rectangular split-ring shaped pattern has an inner edge circumference of not exceeding $0.5\lambda_1$; the four square metal foils are arranged in a centrally symmetric manner, and the split-ring shaped pattern is open towards a symmetry center; a symmetry center axis passes through a geometric center of the second dielectric substrate; the first radiation structure is able to generate two operating frequency bands with center frequencies of $f_0$ and $f_1$, respectively, wherein $\lambda_0$ is a wavelength corresponding to $f_0$, and $\lambda_1$ is a wavelength corresponding to $f_1$; the first radiator comprising the first radiation structure is able to generate three operating frequency bands at this time.

15. A communication device, comprising the multi-frequency base station antenna unit according to claim 14.

16. A communication device, comprising the multi-frequency base station antenna unit according to claim 1.

* * * * *

UNITED STATES PATENT AND TRADEMARK OFFICE
CERTIFICATE OF CORRECTION

| | | |
|---|---|---|
| PATENT NO. | : 12,327,928 B1 | Page 1 of 1 |
| APPLICATION NO. | : 18/875413 | |
| DATED | : June 10, 2025 | |
| INVENTOR(S) | : Wenquan Che et al. | |

It is certified that error appears in the above-identified patent and that said Letters Patent is hereby corrected as shown below:

On the Title Page

Above Foreign Application Priority Data, insert:
--Prior Publication Data
US 2025/174895 A1 May 29, 2025--

Signed and Sealed this
Ninth Day of September, 2025

Coke Morgan Stewart
*Acting Director of the United States Patent and Trademark Office*